US011119892B2

(12) United States Patent
Feng et al.

(10) Patent No.: US 11,119,892 B2
(45) Date of Patent: Sep. 14, 2021

(54) METHOD, DEVICE AND COMPUTER-READABLE STORAGE MEDIUM FOR GUIDING SYMBOLIC EXECUTION

(71) Applicant: BAIDU ONLINE NETWORK TECHNOLOGY (BEIJING) CO., LTD., Beijing (CN)

(72) Inventors: Qian Feng, Beijing (CN); Shengjian Guo, Beijing (CN); Peng Li, Beijing (CN); Minghua Wang, Beijing (CN); Yulong Zhang, Beijing (CN); Tao Wei, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/829,593

(22) Filed: Mar. 25, 2020

(65) Prior Publication Data
US 2021/0019250 A1    Jan. 21, 2021

(30) Foreign Application Priority Data

Jul. 16, 2019    (CN) .......................... 201910639918.3

(51) Int. Cl.
  *G06F 9/44*    (2018.01)
  *G06F 11/36*   (2006.01)
  *G06N 3/08*    (2006.01)

(52) U.S. Cl.
  CPC ...... *G06F 11/3636* (2013.01); *G06F 11/3684* (2013.01); *G06N 3/08* (2013.01)

(58) Field of Classification Search
  None
  See application file for complete search history.

(56) References Cited

U.S. PATENT DOCUMENTS 10,275,249 B1 * 4/2019 Richins ................. G06F 9/3844
2007/0239975 A1 * 10/2007 Wang ...................... G06F 9/381
                                                        712/241

(Continued)

OTHER PUBLICATIONS

Alatawi et al., Leveraging Abstract Interpretation for Efficient Dynamic Symbolic Execution, 2017 IEEE (Year: 2017).*

*Primary Examiner* — Insun Kang
(74) *Attorney, Agent, or Firm* — Brooks Kushman P.C.

(57) ABSTRACT

The present disclosure provides a method, apparatus, device and computer-readable storage medium for guiding symbolic execution. According to embodiments of the present disclosure, it is possible to determine the specific code region of the program, and obtain the program loop output of the program corresponding to the specific code region of the program by using the program inverse analysis method, so that it is possible to obtain the program loop input of the program corresponding to the specific code region by using the program loop predictor according to the program loop output of the program. In this way, the obtained program loop input of the program corresponding to the specific code region may be used to guide the symbolic execution to filter out impossible execution paths and jump out of the program code and reach the specific code region, thereby improving the reliability of the symbolic execution.

12 Claims, 2 Drawing Sheets

(56) References Cited

U.S. PATENT DOCUMENTS

| | | | |
|---|---|---|---|
| 2011/0088016 A1* | 4/2011 | Ball | G06F 8/43 717/128 |
| 2012/0311545 A1* | 12/2012 | Li | G06F 11/3676 717/132 |
| 2015/0293577 A1* | 10/2015 | Hall | G06F 9/30065 713/320 |
| 2015/0363305 A1* | 12/2015 | Guan | G06F 11/3688 717/132 |
| 2017/0286271 A1* | 10/2017 | Pidan | G06F 11/3688 |
| 2018/0114026 A1* | 4/2018 | Wang | G06F 21/577 |
| 2019/0384697 A1* | 12/2019 | Phan | G06F 11/3676 |
| 2020/0278848 A1* | 9/2020 | Ebcioglu | G06F 30/392 |

\* cited by examiner

METHOD, DEVICE AND COMPUTER-READABLE STORAGE MEDIUM FOR GUIDING SYMBOLIC EXECUTION

CROSS REFERENCE TO RELATED APPLICATIONS

The present application claims the priority of Chinese Patent Application No. 2019106399183, filed on Jul. 16, 2019, with the title of "Method, apparatus, device and computer-readable storage medium for guiding symbolic execution". The disclosure of the above applications is incorporated herein by reference in its entirety.

FIELD OF THE DISCLOSURE

The present disclosure relates to software testing techniques, and particularly to a method, apparatus, device and computer-readable storage medium for guiding symbolic execution.

BACKGROUND OF THE DISCLOSURE

Symbolic execution is a program-analyzing technique, and it may obtain a program input reaching a specific code region by analyzing the program. For example, in software test, the symbolic execution may be used to generate the program input that may reach a code region where a bug point of the program lies.

However, in some cases, for example, the path explosion phenomenon might exist in symbolic execution upon a program loop in the processing program, so that the symbolic execution cannot jump out of the program loop such that it is impossible to generate the program input that may reach the specific code region of the program, thereby causing degradation of reliability of the symbolic execution.

SUMMARY OF THE DISCLOSURE

A plurality of aspects of the present disclosure provide a method, apparatus, device and computer-readable storage medium for guiding symbolic execution, to improve the reliability of symbolic execution.

According to an aspect of the present disclosure, there is provided a method for guiding symbolic execution, comprising: determining a specific code region of a program; obtaining a program loop output of the program corresponding to the specific code region of the program by using a program inverse analysis method; obtaining a program loop input of the program corresponding to the specific code region by using a program loop predictor according to the program loop output of the program.

According to another aspect of the present disclosure, there is provided an apparatus for guiding symbolic execution, comprising: a determination unit configured to determine a specific code region of a program; an execution unit configured to obtain a program loop output of the program corresponding to the specific code region of the program by using a program inverse analysis method; a prediction unit configured to obtain a program loop input of the program corresponding to the specific code region by using a program loop predictor according to the program loop output of the program.

According to a further aspect of the present disclosure, there is provided a device, comprising: one or more processors; a storage for storing one or more programs, the one or more programs, when executed by the one or more processors, cause the one or more processors to implement the method for guiding symbolic execution according to the above first aspect.

According to a further aspect of the present disclosure, there is provided a computer-readable storage medium on which a computer program is stored, the program, when executed by a processor, implementing the method for guiding symbolic execution according to the above first aspect.

As known by the above technical solutions, in embodiments of the present disclosure, it is possible to, by determining the specific code region of the program, obtain the program loop output of the program corresponding to the specific code region of the program by using the program inverse analysis method, so that it is possible to obtain the program loop input of the program corresponding to the specific code region by using the program loop predictor according to the program loop output of the program. In this way, the obtained program loop input of the program corresponding to the specific code region may be used to guide the symbolic execution to filter out impossible execution paths and jump out of the program code and reach the specific code region, thereby improving the reliability of the symbolic execution.

In addition, according to the technical solutions provided by the present disclosure, it is possible to generate a valid program loop input of the program that reaches the specific code region of the program and thereby effectively improve the test efficiency of the program.

In addition, according to the technical solution provided by the present disclosure, it is unnecessary to perform complicated static analysis of the loop logics in the program loop, but necessary to simulate the loop logic of the program loop by learning the program loop input and program loop output by a machine learning method. The consumption of either the memory or the CPU is light weighted.

In addition, according to technical solutions provided by the present disclosure, learning the program loop input and program loop output by a machine learning method to simulate the loop logics of the program loop has broader applicability than generating the loop summary as usually done. This is because the loop summary only acts upon some linear logic loops, whereas the loop logics learnt by the machine learning method may simulate non-linear logics. When the loop cannot reach the specific code region of the program due to the loop, symbolic execution may be guided according to the loop input predicted by the loop predictor to quickly reach the designated region.

In addition, according to technical solutions provided by the present disclosure, it is possible to, by directly predicting the program loop input of the program according to the program loop output of the program corresponding to the specific code region of the program, effectively filter out all other impossible execution paths so as to quickly jump out of the program loop and reach the specific code region, generate a valid test case and effectively improve the test efficiency of the program.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "I" in the text generally indicates associated objects before and after the symbol are in an "or" relationship.

As stated in Background, in some cases, for example, the phenomenon path explosion might exist in symbolic execution upon a program loop in the processing program because the program loop is executed so many times, so that the symbolic execution cannot jump out of the program loop such that it is impossible to generate the program input that may reach a specific code region of the program. The so-called path explosion refers to a phenomenon that the number of paths in the program increases exponentially as the number of branches in the program increases.

In the prior art, there may be several techniques for solving the program loop issue of the symbolic execution, but they have the following several problems:

Convert unbounded program loop into bounded program loop so that the symbolic execution jumps out of the program loop. Such technique causes symbolic execution to lose completeness, thereby missing some specific code regions, e.g., a specific code region where a bug lies;

Use some experience conditions to guide symbolic execution to jump out of the program loop. Such a method does not have generic properties and also has a possibility of losing completeness.

Use a loop summary method to guide symbolic summary to jump out of the program loop. However, how to seek for an efficient loop invariant is currently still in a preliminary research phase. Furthermore, it is very difficult for most program loops to generate the loop invariant so that it becomes impossible that the symbolic execution jumps out of the program loop.

At present, although symbolic execution may accurately execute each instruction, its accuracy causes it to consume too many resources in the program loop and furthermore, symbolic execution cannot jump out of the program loop and the issue of status explosion will occur. Particularly when the boundary of the program loop is not determined, symbolic execution is substantially trapped in the program loop and cannot automatically jump out of the program loop. Hence, the status explosion will cause symbolic execution to fail to analyze a large-sized program library containing the program loop.

In view of the above, the present disclosure provides a method of guiding symbolic execution to solve the program loop issue of symbolic execution and improve the reliability of symbolic execution.

Figure 1:
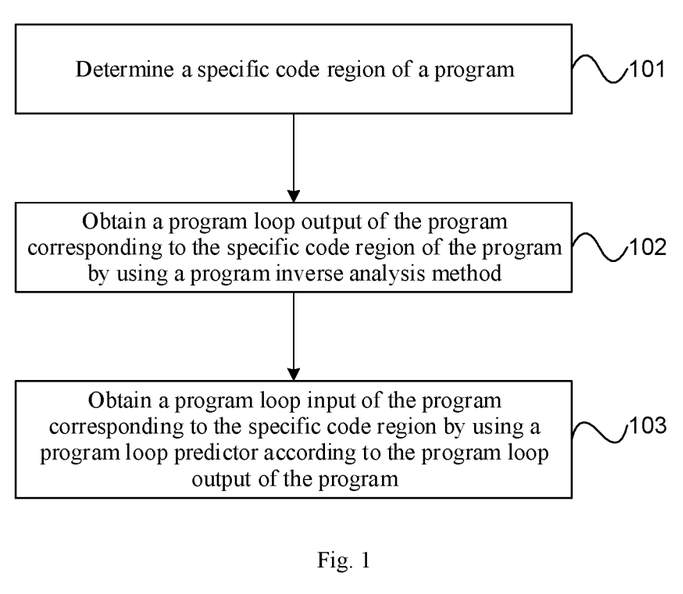
FIG. 1 is a flow chart of a method of guiding symbolic execution according to an embodiment of the present disclosure.

FIG. 1 is a flow chart of a method of guiding symbolic execution according to an embodiment of the present disclosure. As shown in FIG. 1, the method comprises the following steps:

101: determining a specific code region of a program.

102: obtaining a program loop output of the program corresponding to the specific code region of the program by using a program inverse analysis method.

The so-called program loop output refers to a program state after symbolic execution executes the program loop.

103: obtaining a program loop input of the program corresponding to the specific code region by using a program loop predictor according to the program loop output of the program.

The so-called program loop input refers to a program state before symbolic execution executes the program loop.

So far, the obtained program loop input of the program corresponding to the specific code region of the program may be used to effectively guide the symbolic execution to jump out of the program loop, thereby quickly reaching the specific code region (e.g., the code region where a bug point lies) and generating a test case of the program.

In the present disclosure, an effective execution path is designed according to the program state predicted by the program loop predictor, namely, the program loop input corresponding to the specific code region of the program to guide the symbolic execution to select a path so that it only selects the path selected by the predicted program state as next execution path until the specific code region (e.g., the code region where a bug point lies) is triggered.

It needs to be appreciated that subjects for executing 101-103 may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

As such, it is possible to, by determining the specific code region of the program, obtain the program loop output of the program corresponding to the specific code region of the program by using the program inverse analysis method, so that it is possible to obtain the program loop input of the program corresponding to the specific code region by using the program loop predictor according to the program loop output of the program. In this way, the obtained program loop input of the program corresponding to the specific code region may be used to guide the symbolic execution to filter out impossible execution paths and jump out of the program code and reach the specific code region, thereby improving the reliability of the symbolic execution.

Usually, in software test, a bug point of the program generally needs to be tested for analysis and repair processing. Hence, the specific code region of the program involved in the present disclosure may include but is not limited to the code region where the bug point of the program lies. This is not particularly limited in the present disclosure.

Optionally, in a possible implementation mode of the present embodiment, at 101, the specific code region of the program may be specifically determined by using abstract interpretation. As such, a location where the bug of the program occurs, namely, the bug point can be quickly positioned by using abstract interpretation.

The so-called abstract interpretation means using calculation on another abstract object domain to abstract calculation on an object domain referred to by an approximation program, so that a result of program abstract execution can reflect partial information of real running of the program.

A basic principle of abstract interpretation is using value analysis in program static analysis, and a process of value analysis stores a program state after each operation. The program state may be represented with a map in the abstract interpretation, for example, a key represents an active variable in the program. The value is a range of values of the variable under a current instruction. The abstract interpretation means traversing all paths on a program control flow graph, and recording a program state for each node on the control flow graph after the node is operated.

The control flow graph (CFG) is also called a control flowchart, is an abstract representation of a program, is an abstract data structure in a compiler, is internally maintained by the complier, and represents all paths that are traversed by the execution process of a program. Each node in the graph in the control flow graph represents a basic block. It represents, in the form of a graph, possible flow directions of execution of all basic blocks in a program, and can also reflect a real-time execution process of a program.

Optionally, in a possible implementation mode of the present embodiment, before 102, it is further possible to execute an operation of building a program loop predictor.

In the implementation mode, a training data set may be collected with abstract interpretation. The training data set is composed of program state sets generated by each iteration operation in the program loop. This portion of work may be completed by a path searching engine.

For example, the path searching engine may specifically provide a training data set for the program loop predictor. Here, the abstract interpretation may be employed as a training data collector to collect the training data for the path searching engine. Since the program loop predictor aims to learn value operations in the program loop, the collected training data is a current range of all program variables after each iteration operation. While executing the program loop, the abstract interpretation may record the current range of all program variables for each iteration operation. Hence, the abstract interpretation is used to execute the program loop for many times, and execution of the program each time may provide different input values. The path searching engine is recording a program range of program variables while the abstract interpretation executes the program loop, and storing the program range of all program variables into the training data set according to times of their iteration operations and the execution paths.

After the collection of the training data set is completed, a Recurrent Neural Network (RNN) may be used to learn the training data set generated by the abstract interpretation and build the program loop predictor. As such, simulating an internal logic of the program loop with the neural network can reduce complexity of cyclic operations in the program loop, thereby making accurate symbolic execution become possible.

A learning target of the so-called training data set is predicting the program loop input of the program corresponding to the specific code region of the program according to the program loop output of the program corresponding to the specific code region of the program, so that execution of each step according to an initial state of the program, namely, the program loop input is closest to the program state of the specific code region, namely, the program loop output.

In a specific implementation process, it is specifically possible to use the abstract interpretation to obtain a program state before the first iteration operation in the program loop of the program and a program state after each iteration operation, and thereby possible to regard the program state before each iteration operation and the program state after the iteration operation as a piece of training data.

Specifically, the abstract interpretation is performing value analysis on the control flow of the program. Regarding the control flow graph containing the program loop, the abstract interpretation, after executing each iteration operation in the program loop, will update the program state on each basic block on the control flow graph containing the program loop until reaching an iteration boundary of the program loop. Regarding an undefined boundary, the abstract interpretation needs to perform widening processing, and enables jump out of the program loop by using accuracy in place of time.

In this implementation process, the abstract interpretation is used to automatically generate the training data, and record the program state on the control flow graph (namely, each program variable) after each iteration operation, and store the program state into the training data set. As for an iteration operation, the program in the program loop is a tree structure, each branch has a different operation, and the program state of its operation result is also different. Hence, each execution path from a root node of the tree to a leaf node may be regarded as a piece of training data, its input is the program state of the root node of the tree before the iteration operation, and its output is the program state of the leaf node of the tree after the iteration operation. Data $p1=[i1,i1]$ of one iteration operation may be obtained by traversing the whole tree. Assuming that the training data only employ the data resulting from iterating the program loop first n times, and the data pi may be obtained after each iteration operation i. A piece of training data $data1=[p1, p2, p3, \ldots, pn]$ may be obtained by traversing n iteration operations sequentially. A training data set with sufficient training data may be generated by changing the input value of the program loop and by performing abstract interpretation many times.

In another specific implementation process, after at least two pieces of training data are generated, the at least two pieces of training data may be used to build the program loop predictor based on a Recurrent Neural Network (RNN). This portion of work may be completed by a path learning engine.

It may be appreciated that in fact, two pieces of training data, even three or four pieces of training data are far from enough, sufficient training data need to be generated, then these training data are used to build the program loop predictor based on the RNN.

The program state records a range of current values of all program variables and is a value interval, and the value interval may not directly act upon the RNN. Therefore, it is necessary to perform embedding (vectorization) operation for the value interval of the program variables, and preprocess the value interval of the program variables and then convert it in a value form acceptable by the RNN. That is to say, the interval form of the value may be converted into a real value. The real value is not a simple index, but can ensure that the converted real number is consistent with the value interval before the conversion in grammatical and semantic similarities.

Specifically, it is possible to performing embedding processing for the program state in the at least two pieces of training data to obtain a state vector, and thereby build the program loop predictor based on the RNN by using the at least two pieces of training data after the embedding processing.

For example, an embedding technique of a word vector (word2vec) may be drawn on to perform the embedding operation for the program state. Word2Vec is used to perform the embedding operation for a word in Nature Language Processing (NLP). By mapping the word to a high dimensional vector, it is ensured that the high dimensional vector after the conversion causes a value of a final loss function to be minimized. For example, the input is a program state, namely, a range of values of the program variables, a high dimensional vector that the output is (e1, e2, ... en) may be obtained after mapping, and each output is an embedding result corresponding to the program variables.

The program loop may be regarded as a network structural diagram of RNN. The program loop is a repeated operation of a program logic in a single iteration operation. Each iteration operation regards the output of a previous iteration operation as the input. The RNN network herein simulates the internal logic of the program loop, but differs from the program loop in that the input of RNN is the program state after the $N^{th}$ iteration operation, and the output is the program state before the first iteration operation.

The RNN-based program loop predictor built in the present disclosure predicts the input value, namely, the program state corresponding to the program state after the $N^{th}$ iteration operation by simulating the program loop. As such, the predicted program state may be employed as a guidance to guide the symbolic execution to jump out of the program loop and reach the specific code region (e.g., the code region where the bug point lies).

Assuming that the times of iteration operations of the loop is N, {p1, p2, ..., pN} records the output of each iteration operation in N iteration operations. PN refers to the output after the N iteration operations. Each input of the RNN is the program state after the iteration operation is performed N times. The program state here is an embedding result $p_n\{y_0, y_1, \ldots y_n\}$ after the embedding operation. A final purpose of the built RNN-based program loop predictor is to guide the symbolic execution to jump out of the program loop and reach the specific code region (e.g., the code region where the bug point lies). For example, a real program state set of the program loop input of the program may be regarded as a label. A target of the RNN-based program loop predictor is to predict the program loop input corresponding to the specific code region according to the program loop output corresponding to the specific code region, and then a loss function may be expressed as follows:

$$\frac{1}{N}\sum_{i=0}^{n} d(y_i, \overline{y}_i)$$

where $y_i$ is a value of the $i^{th}$ bit of the program state set predicted by the RNN; $\overline{y}_i$ is a value of the $i^{th}$ bit of a real program state set of the program loop input of the program loop. As such, it is possible to calculate a difference between the real program state and the program state predicted by the RNN, and then use the difference to guide the RNN to train the logic of the program loop. To prevent learning rate decay, Long Short Term Memory (LSTM) is employed in the present disclosure as a network structure of the RNN simulating the program loop.

After the building of the program loop predicted is completed, the program loop input of the program corresponding to the specific code region may be obtained by using the program loop predictor according to the obtained program loop output of the program.

Then, it is possible to further use the program loop input of the program corresponding to the obtained specific code region of the program to effectively guide the symbolic execution to jump out of the program loop and reach the specific code region (e.g., the code region where the bug point lies), and generate a test case of the program. This portion of work may be completed by a path selecting engine. A symbolic execution tool such as klee may be used in the present disclosure to implement generation of the test case by the path selecting engine.

Since the program loop predictor simulates the loop logic in the program loop, it is possible to use the built program loop predictor to predict generation of a corresponding program loop input, for the program loop output corresponding to the specific code region (e.g., the code region where the bug point lies) generated by each abstract interpretation. Then, the symbolic execution executes the program loop input of the program loop, and may generate the corresponding program loop output of the program loop so as to reach the specific code region (e.g., the code region where the bug point lies).

Therefore, the input value generated by the program loop predictor may be used to guide the symbolic execution to screen out unnecessary paths and jump out of the loop and generate the test case of the specific code region (e.g., the code region where the bug point lies)

Specifically, the path selecting engine may specifically guide the symbolic execution to execute an instruction address to reach and trigger the specific code region (e.g., the code region where the bug point lies), according to the program loop input of the program corresponding to the specific code region of the program predicted by the program loop predictor. Since the program loop predictor predicts the program loop input corresponding to the reachable specific code region (e.g., the code region where the bug point lies) according to the program loop output corresponding to the specific code region (e.g., the code region where the bug point lies), use of the predicted program loop input may effectively ensure certain reach to the specific code region (e.g., the code region where the bug point lies). Upon executing each time, symbolic execution selects a branch according to variable values in the predicted program state set. During execution, the symbolic execution will look up for the variable on the branch upon meeting the branch, whereupon according to the variable value in the predicted program state value, symbolic execution may quickly reach the specific code region (e.g., the code region where the bug point lies), needless to take time to explore other invalid execution paths.

In the present disclosure, an effective path is designed according to the predicted state of the program loop, namely, the program loop input corresponding to the specific code region of the program to guide the path selection of symbolic execution, so that it only selects the path selected by the predicted state each time as the next execution path, until reaching the specific code region (e.g., the code region where the bug point lies).

In the present disclosure, the program loop predictor of the program is generated by learning a loop behavior of the program through reinforcement learning. It is possible to, through the program loop predictor, to effectively guide the symbolic execution to look for an optimized and effective execution path, thereby quickly generating the test case of the program.

As compared with the conventional method of loop summary based on the program loop, the technical solution according to the present disclosure has the following advantages:

1. Light Weight

The present disclosure may be embodied in light weight in the method of generating the loop variables; as compared with the conventional method of loop summary based on the program loop, the present disclosure needn't consider all loop logics in the program loop, and symbolic execution can reach the specific code region (e.g., the code region where the bug point lies) needless to record all loop logics in the program loop.

As such, it is unnecessary to perform complicated static analysis of the loop logics in the program loop and record all loop logics in the program loop, but necessary to simulate the loop logic of the program loop by learning the program loop input and program loop output by a machine learning method. The consumption of either the memory or the CPU is light weighted.

2. Error Checking

In the present disclosure, it is only necessary to generate the program loop input of the program corresponding to the specific code region of the program corresponding to the program loop output of the program corresponding to the specific code region of the program, not to generate a loop summary of the program loop. When the symbolic execution cannot reach the specific code region of the program according to the generation result, if the loop summary of the program loop is based on, if the summary generates an error, the symbolic execution cannot predict whether the generated invalid program input originates from the error of the summary or is a real false positive.

As such, learning the program loop input and program loop output by a machine learning method to simulate the loop logics of the program loop has broader applicability than generating the loop summary as usually done. This is because the loop summary only acts upon some linear logic loops, whereas the loop logics learnt by the machine learning method may simulate non-linear logics. When the loop cannot reach the specific code region of the program due to the loop, symbolic execution may be guided according to the loop input predicted by the loop predictor to quickly reach the designated region.

3. Quickness

According to a conventional method based on the loop summary of the program loop, all loop logics in the program loop are recorded, and the program logic to be executed in next step is explored according to each recorded loop logic until the specific code region (e.g., the code region where the bug point lies) is reached. According to the method, it is necessary to calculate the corresponding program input based on a formula generated by each loop logic. If the number of loop logics increases abruptly, the consumed time also increases exponentially.

As such, it is possible to, by directly predicting the program loop input of the program according to the program loop output of the program corresponding to the specific code region of the program, effectively filter out all other impossible execution paths so as to quickly jump out of the program loop and reach the specific code region, generate a valid test case and effectively improve the test efficiency of the program.

According to the technical solution provided by the present disclosure, it is possible to learn the internal logics of the program loop on an intermediate result (e.g., values of all program variables on the execution path of the program loop of the program) of the abstract interpretation, thereby generate the program loop predictor, guide the symbolic execution to jump out of the program loop and generate the valid program loop input and thereby form the valid test case. Specific advantageous effects are as follows:

1. Overcome the already existing bottleneck of manually adding a value range of the abstract interpretation, and use the instrumentation property of the compiler to automatically complete combination of the abstract interpretation and symbolic execution.

2. Use the machine learning method in the machine learning to learn a result of the abstract interpretation analyzing the program loop, thereby building the program loop predictor to guide the execution path of the symbolic execution, ensuring quick reach to the specific code region of the program and thereby solving the path explosion issue.

3. Driven by the specific code region (e.g., the code region where the bug point lies) generated by the abstract interpretation, efficiently locate the point (namely, the specific code region) to perform symbolic execution, thereby effectively avoiding the waste of time and resources caused by symbolic execution blindly searching the program space.

In the present embodiment, it is possible to, by determining the specific code region of the program, obtain the program loop output of the program corresponding to the specific code region of the program by using the program inverse analysis method, so that it is possible to obtain the program loop input of the program corresponding to the specific code region by using the program loop predictor according to the program loop output of the program. In this way, the obtained program loop input of the program corresponding to the specific code region may be used to guide the symbolic execution to filter out impossible execution paths and jump out of the program code and reach the specific code region, thereby improving the reliability of the symbolic execution.

In addition, according to the technical solution provided by the present disclosure, it is possible to generate the valid program loop input of the program that reaches the specific code region of the program and thereby effectively improve the test efficiency of the program.

In addition, according to the technical solution provided by the present disclosure, it is unnecessary to perform complicated static analysis of the loop logics in the program loop, but necessary to simulate the loop logic of the program loop by learning the program loop input and program loop output by a machine learning method. The consumption of either the memory or the CPU is light weighted.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
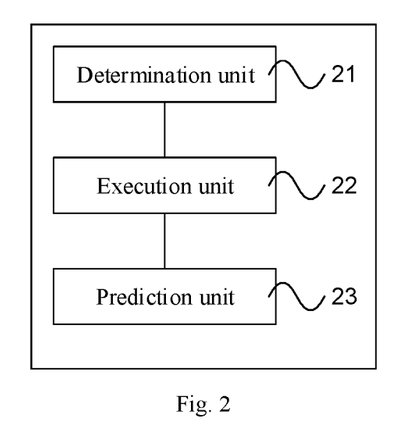
FIG. 2 is a block diagram of an apparatus for guiding symbolic execution according to another embodiment of the present disclosure.

FIG. 2 is a block diagram of an apparatus for guiding symbolic execution according to another embodiment of the present disclosure. As shown in FIG. 2, the apparatus for guiding symbolic execution according to the present embodiment may comprise a determination unit 21, an execution unit 22 and a prediction unit 23, wherein the determination unit 21 is configured to determine a specific code region of a program; the execution unit 22 is configured to obtain a program loop output of the program corresponding to the specific code region of the program by using a program inverse analysis method; the prediction unit 23 is configured to obtain a program loop input of the program corresponding to the specific code region by using a program loop predictor according to the program loop output of the program.

It needs to be appreciated that apparatus for guiding symbolic execution according to the present embodiment may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

Optionally, in a possible implementation mode of the present embodiment, the determination unit 22 is may specifically be configured to determine the specific code region of the program by using abstract interpretation.

Usually, in software test, a bug point of the program generally needs to be tested for analysis and repair processing. Hence, the specific code region of the program involved in the present disclosure may include but is not limited to the code region where the bug point of the program lies. This is not particularly limited in the present disclosure.

Optionally, in a possible implementation mode of the present embodiment, the prediction unit 23 may be further configured to obtain a program state before the first iteration operation in the program loop and a program state after each iteration operation by using the abstract interpretation; regard the program state before each iteration operation and the program state after the iteration operation as a piece of training data; and build the program loop predictor based on a Recurrent Neural Network RNN by using the at least two pieces of training data.

Specifically, the prediction unit 23 is specifically configured to perform embedding processing for the program state in the at least two pieces of training data to obtain a state vector; and build the program loop predictor based on the RNN by using the at least two pieces of training data after the embedding processing.

It needs to be appreciated that the method in the embodiment corresponding to FIG. 1 may be implemented by the apparatus for guiding symbolic execution according to the present embodiment. Reference may be made to relevant resources in the embodiment corresponding to FIG. 1 for detailed description, which will not be detailed any longer here.

In the present embodiment, the determination unit determines the specific code region of the program, then the execution unit uses obtains the program loop output of the program corresponding to the specific code region of the program by using the program inverse analysis method, so that the prediction unit obtains the program loop input of the program corresponding to the specific code region by using the program loop predictor according to the program loop output of the program. In this way, the obtained program loop input of the program corresponding to the specific code region may be used to guide the symbolic execution to filter out impossible execution paths and jump out of the program code and reach the specific code region, thereby improving the reliability of the symbolic execution.

In addition, according to the technical solution provided by the present disclosure, it is possible to generate the valid program loop input of the program that reaches the specific code region of the program and thereby effectively improve the test efficiency of the program.

In addition, according to the technical solution provided by the present disclosure, it is unnecessary to perform complicated static analysis of the loop logics in the program loop, but necessary to simulate the loop logic of the program loop by learning the program loop input and program loop output by a machine learning method. The consumption of either the memory or the CPU is light weighted.

Figure 3:
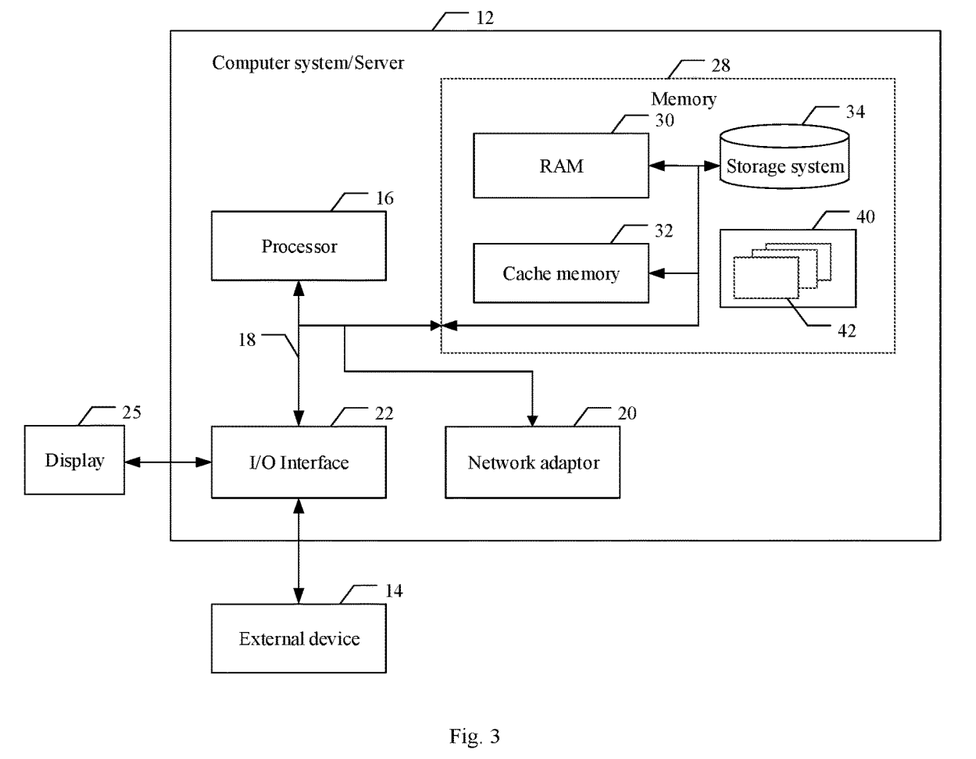
FIG. 3 is a block diagram of an example computer system/server 12 adapted to implement an implementation mode of the present disclosure.

FIG. 3 illustrates a block diagram of an example computer system/server 12 adapted to implement an implementation mode of the present disclosure. The computer system/server 12 shown in FIG. 3 is only an example and should not bring about any limitation to the function and scope of use of the embodiments of the present disclosure.

As shown in FIG. 3, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 3, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method for guiding symbolic execution provided by the embodiment corresponding to FIG. 1.

Another embodiment of the present disclosure further provides a computer-readable storage medium on which a computer program is stored. The program, when executed by a processor, can implement the method for guiding symbolic execution provided by the embodiment corresponding to FIG. 1.

Specifically, the computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A method for guiding symbolic execution, wherein the method comprises:
   determining a specific code region of a program;
   obtaining a program loop output of the program corresponding to the specific code region of the program by using a program inverse analysis method; and
   obtaining a program loop input of the program corresponding to the specific code region by using a program loop predictor according to the program loop output of the program,
   wherein the program loop predictor is obtained by:
   obtaining a program state before a first iteration operation in the program loop and a program state after each iteration operation by using abstract interpretation;
   taking the program state before each iteration operation and the program state after the iteration operation as a piece of training data; and
   building the program loop predictor based on a Recurrent Neural Network (RNN) by using at least two pieces of training data composed of the program state.

2. The method according to claim 1, wherein the determining the specific code region of the program comprises:
   determining the specific code region of the program by using abstract interpretation.

3. The method according to claim 1, wherein the specific code region of the program comprises a code region where a bug point of the program lies.

4. The method according to claim 1, wherein the building the program loop predictor based on the RNN by using the at least two pieces of training data comprises:
   performing embedding processing for the program state in the at least two pieces of training data to obtain a state vector; and
   building the program loop predictor based on the RNN by using the at least two pieces of training data after the embedding processing.

5. A device comprising:
   one or more processors;
   a storage for storing one or more programs,
   the one or more programs, when executed by the one or more processors, cause the one or more processors to implement a method for guiding symbolic execution, wherein the method comprises:
   determining a specific code region of a program;
   obtaining a program loop output of the program corresponding to the specific code region of the program by using a program inverse analysis method; and
   obtaining a program loop input of the program corresponding to the specific code region by using a program loop predictor according to the program loop output of the program,
   wherein the program loop predictor is obtained by:
   obtaining a program state before a first iteration operation in the program loop and a program state after each iteration operation by using abstract interpretation;
   taking the program state before each iteration operation and the program state after the iteration operation as a piece of training data; and
   building the program loop predictor based on a Recurrent Neural Network (RNN) by using at least two pieces of training data composed of the program state.

6. The device according to claim 5, wherein the determining the specific code region of the program comprises:
   determining the specific code region of the program by using abstract interpretation.

7. The device according to claim 5, wherein the specific code region of the program comprises a code region where a bug point of the program lies.

8. The device according to claim 5, wherein the building the program loop predictor based on the RNN by using the at least two pieces of training data comprises:
   performing embedding processing for the program state in the at least two pieces of training data to obtain a state vector; and
   building the program loop predictor based on the RNN by using the at least two pieces of training data after the embedding processing.

9. A non-transitory computer-readable storage medium on which a computer program is stored, wherein the program, when executed by a processor, implements a method for guiding symbolic execution, wherein the method comprises:
   determining a specific code region of a program;
   obtaining a program loop output of the program corresponding to the specific code region of the program by using a program inverse analysis method; and
   obtaining a program loop input of the program corresponding to the specific code region by using a program loop predictor according to the program loop output of the program,
   wherein the program loop predictor is obtained by:
   obtaining a program state before a first iteration operation in the program loop and a program state after each iteration operation by using abstract interpretation;
   taking the program state before each iteration operation and the program state after the iteration operation as a piece of training data; and building the program loop predictor based on a Recurrent Neural Network (RNN) by using at least two pieces of training data composed of the program state.

10. The non-transitory computer-readable storage medium according to claim 9, wherein the determining the specific code region of the program comprises:
determining the specific code region of the program by using abstract interpretation.

11. The non-transitory computer-readable storage medium according to claim 9, wherein the specific code region of the program comprises a code region where a bug point of the program lies.

12. The non-transitory computer-readable storage medium according to claim 9, wherein the building the program loop predictor based on the RNN by using the at least two pieces of training data comprises:
performing embedding processing for the program state in the at least two pieces of training data to obtain a state vector; and
building the program loop predictor based on the RNN by using the at least two pieces of training data after the embedding processing.

\* \* \* \* \*